US011183703B2

(12) United States Patent
Jung

(10) Patent No.: US 11,183,703 B2
(45) Date of Patent: Nov. 23, 2021

(54) FUEL SUPPLY VALVE FOR FUEL CELL SYSTEM

(71) Applicants: Hyundai Motor Company, Seoul (KR); Kia Motors Corporation, Seoul (KR)

(72) Inventor: Se Kwon Jung, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 143 days.

(21) Appl. No.: 15/841,929

(22) Filed: Dec. 14, 2017

(65) Prior Publication Data
US 2019/0081343 A1   Mar. 14, 2019

(30) Foreign Application Priority Data
Sep. 8, 2017 (KR) .................. 10-2017-0115010

(51) Int. Cl.
*H01M 8/2475* (2016.01)
*H01M 8/22* (2006.01)
*H01M 8/04746* (2016.01)
*F02M 37/00* (2006.01)

(52) U.S. Cl.
CPC ...... *H01M 8/2475* (2013.01); *F02M 37/0023* (2013.01); *F02M 37/0047* (2013.01); *H01M 8/04753* (2013.01); *H01M 8/22* (2013.01)

(58) Field of Classification Search
CPC ............... F02M 37/0047; H01M 8/04753
USPC ................. 251/129.15, 149.48, 324
See application file for complete search history.

(56) References Cited

U.S. PATENT DOCUMENTS

| 2,897,836 | A | * | 8/1959 | Peters | F16K 39/022 137/454.5 |
| 3,606,241 | A | * | 9/1971 | Bornholdt | H01F 7/088 251/52 |
| 4,149,559 | A | * | 4/1979 | Wormser | G05D 16/107 137/505.18 |
| 4,795,129 | A | * | 1/1989 | Clark | F16K 31/1221 137/87.03 |
| 5,116,020 | A | * | 5/1992 | Peng | F02M 51/00 137/454.5 |
| 6,935,612 | B2 | * | 8/2005 | McCombs | F16K 31/0696 251/129.15 |
| 2002/0079472 | A1 | * | 6/2002 | Kumar | F16K 31/0655 251/129.07 |
| 2008/0029156 | A1 | * | 2/2008 | Rosal | H01M 8/04208 137/2 |

(Continued)

FOREIGN PATENT DOCUMENTS

| JP | 2002039411 A | 2/2002 |
| JP | 2010-001916 A | 1/2010 |
| KR | 20040014207 A | 2/2004 |

*Primary Examiner* — Angelisa L. Hicks
(74) *Attorney, Agent, or Firm* — Mintz Levin Cohn Ferris Glovsky and Popeo, P.C.; Peter F. Corless

(57) ABSTRACT

A fuel supply valve configured to supply fuel from a fuel tank to a stack is provided. The fuel supply valve includes a plunger that has a hollow portion and a housing having with a cavity in which the plunger is configured to move. Additionally, a contact member is disposed between the housing and the plunger to be in contact both with one side of the housing and with one side of the plunger, the contact member maintaining airtightness between the housing and the plunger.

8 Claims, 5 Drawing Sheets

(56) References Cited

U.S. PATENT DOCUMENTS

| | | | |
|---|---|---|---|
| 2011/0189574 A1* | 8/2011 | Curello | H01M 8/04208 |
| | | | 429/447 |
| 2013/0193650 A1* | 8/2013 | Tohdoh | F16J 15/0887 |
| | | | 277/590 |
| 2016/0079618 A1* | 3/2016 | Fukunaga | H01M 8/04089 |
| | | | 429/429 |
| 2017/0030475 A1* | 2/2017 | Greiner | F16K 31/0655 |
| 2017/0115673 A1* | 4/2017 | Kobayashi | F16K 31/1221 |

* cited by examiner

FUEL SUPPLY VALVE FOR FUEL CELL SYSTEM

CROSS-REFERENCE TO RELATED APPLICATION

This application claims under 35 U.S.C. § 119(a) the benefit of priority to Korean Patent Application No. 10-2017-0115010 filed on Sep. 8, 2017, the entire contents of which are incorporated herein by reference.

BACKGROUND

(a) Technical Field

The present disclosure relates to a fuel supply valve used in a fuel cell system, and more particularly, to a fuel supply valve for a fuel cell system, in which, when fuel is introduced at a high pressure through a hollow portion of a plunger, a contact member on the side surface of the plunger expands to adjust movement of the plunger, and when a valve is opened by upward movement of the plunger, the contact member contracts to improve the airtightness of the valve while permitting smooth movement of the plunger.

(b) Background Art

Generally, a fuel cell system includes, for example, a fuel cell stack that generates electricity, a fuel supply system that supplies fuel (hydrogen) to the fuel cell stack, an air supply system that supplies oxygen in the air, which is an oxidizer required for an electrochemical reaction, to the fuel cell stack, and a heat and water management system that controls the operating temperature of the fuel cell stack. In the fuel supply system, i.e. a hydrogen supply system, compressed hydrogen having a high pressure of approximately 700 bar is stored in a hydrogen tank. The stored compressed hydrogen is discharged to a high-pressure line by the on/off operation of a high-pressure regulator, which is mounted on the inlet of the hydrogen tank, and thereafter is reduced in pressure while passing through a starting valve and a hydrogen supply valve to be supplied to the fuel cell stack.

In other words, in the related art, the hydrogen having a high pressure of approximately 700 bar inside the hydrogen tank is primarily reduced in pressure to 20 bar or less in the high-pressure regulator and is then secondarily reduced in pressure to 4 bar via the hydrogen supply valve or an injector to be supplied to the fuel cell stack. When the secondary pressure reduction is performed using the hydrogen supply valve in the fuel cell system, hydrogen tightness (e.g., a seal) may be achieved via the starting valve and the flow rate of hydrogen may be controlled more accurately via the hydrogen supply valve.

SUMMARY

The present invention integrates a starting valve (hydrogen-blocking valve) and a hydrogen supply valve (flow-rate-regulating valve) provided in a fuel supply system of a fuel cell system, and an object of the present invention is to provide a fuel supply valve, which may adjust the flow rate of hydrogen (fuel) and may completely realize an airtight seal despite the application of high pressure to the leading end thereof without a starting valve.

In one aspect, a fuel supply valve, configured to supply fuel from a fuel tank to a stack, may include a plunger having a hollow portion, a housing having therein a cavity for plunger movement, and a contact member disposed between the housing and the plunger to be in contact both with one side of the housing and with one side of the plunger, wherein the contact member maintains airtightness between the housing and the plunger.

In an exemplary embodiment, the contact member may have a groove formed in a direction in which the fuel, having passed through the hollow portion, is introduced to a gap between the housing and the plunger, and the groove may be widened by a supply pressure of the fuel applied to the hollow portion, causing the contact member to expand to maintain airtightness between the housing and the plunger.

In another exemplary embodiment, when the valve is opened, the widened groove may return to an original state thereof and the contact member may contract to enable upward movement of the plunger. In addition, the contact member may have a first end introduced into the plunger to move along with the plunger and a second end abutting the housing to control the movement of the plunger by the contact member inside the cavity. The first end of the contact member may have a length greater than a length of the second end of the contact member. In addition, the plunger may include a guide member formed on an outer circumferential surface thereof at a position below the contact member along the outer circumference.

In a further exemplary embodiment, the fuel supply valve may include a seal fastened to the plunger at a position between the plunger and a flow path extending from the fuel tank and a protrusion formed on a position of an area in which the plunger and the seal are fastened to each other, and the protrusion may prevent the fuel from leaking from the hollow portion through a gap between the plunger and the seal. The contact member may be formed as a diaphragm. In addition, the diaphragm may be fastened to an upper end of the plunger. In another exemplary embodiment, the diaphragm may be fastened to a lower end of the plunger. In yet another exemplary embodiment, the plunger may be symmetrical about the hollow portion. The fuel supply valve may further include an orifice formed between the hollow portion and the cavity, and the hollow portion and the cavity may communicate with each other via the orifice. The hollow portion may have a width greater than a width of the orifice.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
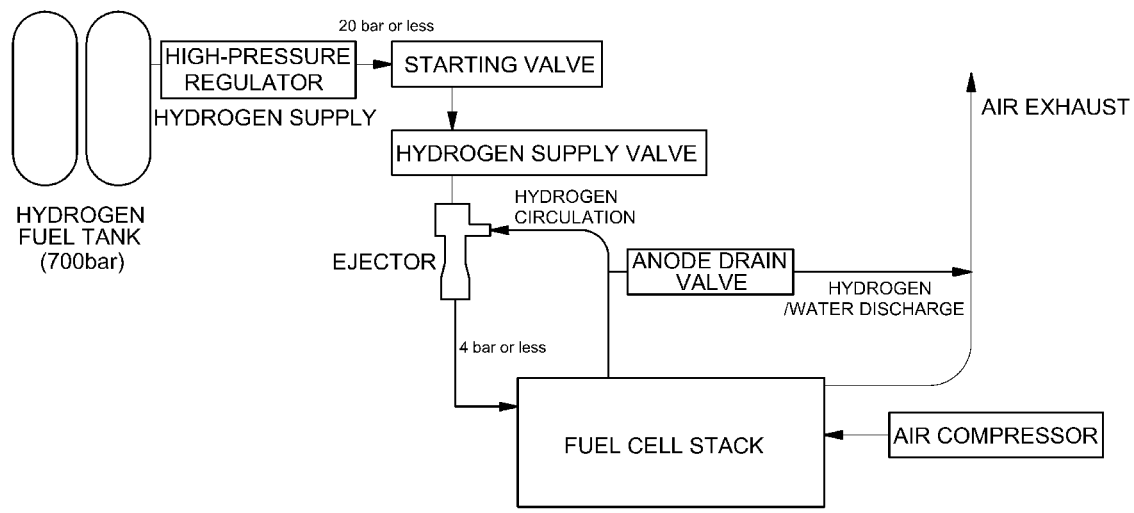
FIG. 1 is a view illustrating the configuration of a fuel cell system having a starting valve and a fuel supply valve in a fuel supply system according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, the exemplary embodiments of the present invention will be described in detail with reference to the accompanying drawings. The exemplary embodiments of the present invention may be modified in various ways, and the scope of the present invention should not be construed as being limited to the following embodiments. The exemplary embodiments disclosed here are provided to more completely describe the disclosure to those of ordinary skill in the art.

A fuel cell system mounted in a vehicle basically includes, for example, a fuel cell stack that generates electricity, a fuel supply system that supplies fuel (hydrogen) to the fuel cell stack, an air supply system that supplies oxygen in the air, which is an oxidizer required for an electrochemical reaction, to the fuel cell stack, and a cooling system that dissipates reaction heat of the fuel cell stack to the outside of the system and adjusts the operating temperature of the fuel cell stack.

FIG. 1 is a view illustrating the schematic configuration of a fuel cell system in which a fuel supply system includes two valves and an ejector according to an exemplary embodiment of the present invention. The fuel supply system of the fuel cell system may include a high-pressure fuel tank. The high-pressure fuel tank may store therein hydrogen fuel, more particularly, hydrogen gas having a high-pressure of approximately 700 bar. The high-pressure fuel may not be directly supplied to a fuel cell stack, and therefore, may be reduced in pressure via a high-pressure regulator and a valve to be supplied to the fuel cell stack. The high-pressure fuel may be primarily reduced in pressure to approximately 20 bar or less by the high-pressure regulator. Then, the decompressed fuel may be secondarily reduced in pressure using a valve or an injector. In particular, the fuel may be reduced in pressure to 4 bar or less. When the valve, other than the injector, is used for secondary decompression in this way, the valve needs to have tightness (e.g., a seal) for the fuel having a pressure of approximately 20 bar and also need to accurately control the flow rate of fuel.

Figure 2:
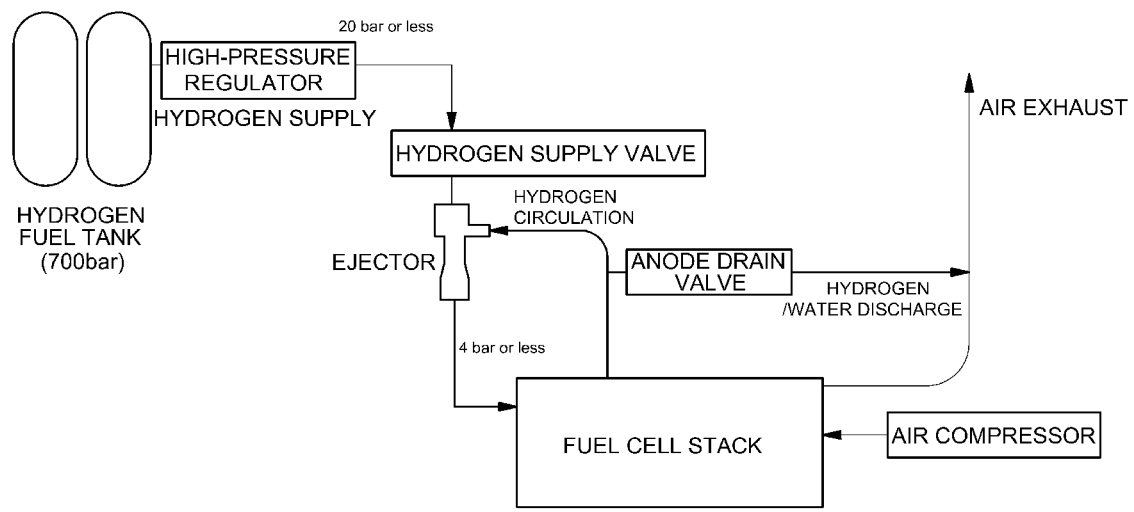
FIG. 2 is a view illustrating the configuration of a fuel cell system having only a fuel supply valve in a fuel supply system according to an exemplary embodiment of the present invention.

FIG. 2 is a view schematically illustrating a fuel cell system according to an exemplary embodiment of the present invention. Compared to FIG. 1, the present invention is characterized in that a starting valve (hydrogen-blocking valve) is omitted and a fuel supply valve (hydrogen flow-rate-regulating valve) has an improved structure to have fuel tightness and to more accurately control the flow rate of fuel. In other words, the present invention relates to the improved configuration of the fuel supply system, which may be provided in the fuel supply system of the fuel cell system.

The fuel supply valve illustrated in the present invention may be a solenoid valve, or may be a valve, the opening/closing of which may be adjusted based on particular conditions. In particular, "opening" may refer to the state in which a plunger moves upward so that fuel introduced from the fuel tank passes through the valve to be supplied to the fuel cell stack. Additionally, "closing" may refer to the state in which the plunger moves downward to be in close contact with a valve seat so that the valve prevents the fuel introduced from the fuel tank from being supplied to the fuel cell stack.

Figure 3:
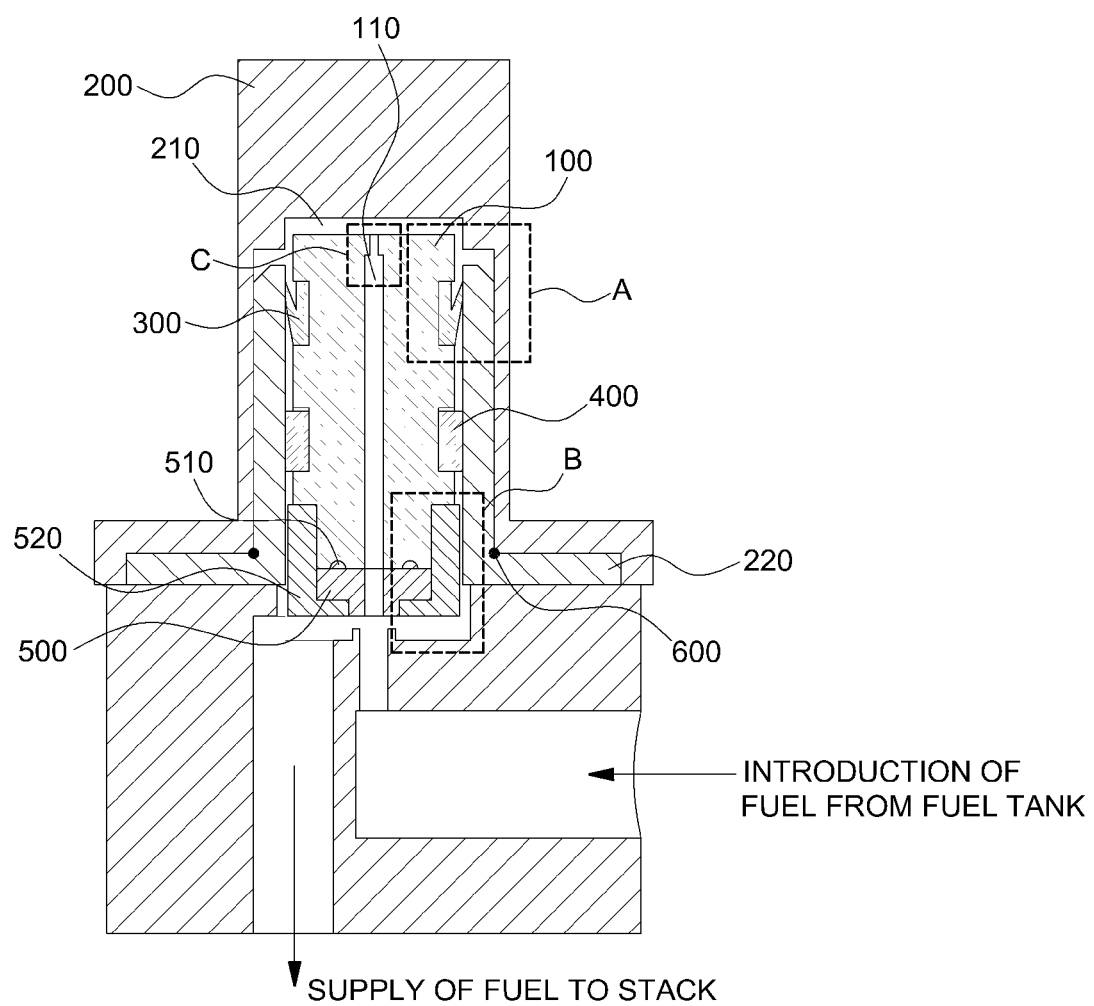
FIG. 3 is a view illustrating the configuration of a fuel supply valve having a contact member according to an exemplary embodiment of the present invention.

FIG. 3 is a view illustrating the configuration of the fuel supply valve according to an exemplary embodiment of the present invention. In FIG. 3, as constituent elements of the fuel supply valve, a housing 200, a plunger 100, a seal 500, and a valve seat are illustrated. Referring to FIG. 3, a horizontal flow path on the right side is a flow path along which fuel may be introduced from the fuel tank to the fuel supply valve, and a vertical flow path on the left side is a flow path along which the fuel, having passed through the plunger 100, may be supplied to the fuel cell stack.

As shown in the configuration of the fuel supply valve in detail with reference to FIG. 3, first, the housing 200 may be provided as an outermost constituent element of the valve to ensure the durability of the valve. The housing 200 may have a shape that corresponds to the shape of the valve and may have a small thickness to ensure a simplified package and the smooth flow of magnetic force. The lower end of the housing 200 may be fastened to a constituent element of the fuel cell system in which the flow path extending from the fuel tank and the flow path extending to the fuel cell stack may be formed. In addition, a yoke 220 may be formed inside the housing 200. The yoke 220 inside the housing 200 may be formed in an area in which it comes into contact with the plunger 100 and in an area in which it comes into contact with the constituent element in which the flow path extending from the fuel tank and the flow path extending to the fuel cell stack are formed. A plunger spring may be disposed between the lower end or the upper end of the plunger 100 and the housing 200 to move the plunger 100 vertically.

A portion of the housing 200 or the entire housing 200 may be formed of a magnetic material. Thus, the housing 200 may be magnetized when a magnetic field is applied thereto. Through the magnetization of the housing 200, the plunger 100 inside the housing 200 may be moved. More particularly, a portion of the housing 200 on the upper end of the plunger 100 may be formed of a magnetic material to pull the plunger 100 when it is magnetized by the magnetic field applied thereto. Thus, the housing 200 may structurally realize the airtightness of the valve and may magnetically influence the movement of the plunger 100.

Hereinafter, the configuration of the fuel supply valve including a contact member 300 according to an exemplary embodiment of the present invention will be described with reference to FIGS. 3 to 5. In the fuel supply valve of the present invention, the plunger 100 may be accommodated inside the housing 200 of the valve. The space between the housing 200 and the plunger 100 may be referred to as a "cavity 210".

In addition, in the present invention, the contact member 300 may be disposed between the housing 200 and the plunger 100 to come into contact both with one side of the housing 200 and with one side of the plunger 100. In the present invention, the term "contact" refers to the state in which two members are in contact with each other, having the same meaning as "close contact", "fastened", "attached", "abut" and the like, and also refers to the state in which the two members are movable by a certain degree of frictional force. Thus, in the present invention, the housing 200 and the plunger 100 accommodated inside the housing 200 may be provided, and the cavity 210 may be formed between the housing 200, the plunger 100, and the contact member 300 by the contact member 300, which comes into contact both with the plunger 100 and with the housing 200.

The plunger 100 according to an exemplary embodiment of the present invention may include a hollow portion 110 that penetrates the plunger 100. Specifically, the hollow portion 110 may be a cylindrical empty space inside the plunger 100, and thus the plunger 100 may take the form of a cylinder having a circular passage therein. The hollow portion 110 may be disposed in the center of the plunger 100 and may be parallel to the longitudinal direction of the plunger 100. In addition, the plunger 100 may have a horizontally symmetrical structure about the hollow portion 110.

Since the hollow portion 110 of the plunger 100 penetrates the plunger 100, the hollow portion 110 may communicate both with the flow path that extends from the fuel tank and with the cavity 210, whereby the fuel introduced from the fuel tank and the pressure of the fuel may be applied to the cavity 210 through the hollow portion 110. Accordingly, the pressure applied to the cavity 210 may push the plunger 100 downwards. Hence, even when the flow path that extends from the fuel tank applies high pressure to the leading end of the valve, since the cavity 210 between the housing 200 and the plunger 100 may apply the same pressure to push the plunger 100 downwards (i.e. in the direction in which the valve is closed), the plunger 100 may be affected only by spring force. As a result, the same plunger spring force may be required both under a general operating pressure condition and under a maximum operating pressure condition.

In addition, referring to FIG. 3, an orifice may be formed in the end of the hollow portion 110. Specifically, the orifice, which has a width less than a width of the hollow portion 110, may be formed between the hollow portion 110 and the cavity 210. The diameters of the orifice and the hollow portion 110 may be designed to vary based on the flow rate of fuel, more particularly, the flow rate of hydrogen, required in the fuel cell system. The pressure between the cavity 210 and the hollow portion 110 and the flow rate of fuel may be adjusted based on the diameter of the orifice. Since the hollow portion 110 communicates with the flow path that extends from the fuel tank, and therefore, substantially the same pressure as the pressure in the flow path that extends from the fuel tank may be applied to the hollow portion 110, the pressure inside the cavity 210 may be substantially adjusted via the diameter of the orifice.

In addition, in an exemplary embodiment of the present invention, the contact member 300 may be disposed between the plunger 100 and the housing 200 to come into contact both with one side of the plunger 100 and with one side of the housing 200. A first end 300a of the contact member 300 may be inserted into one side of the plunger 100 to move vertically (e.g., upward or downward) along with the plunger 100, and a second end 300b of the contact member 300 may be in close contact with the housing 200 (see FIG. 4).

Figure 4:
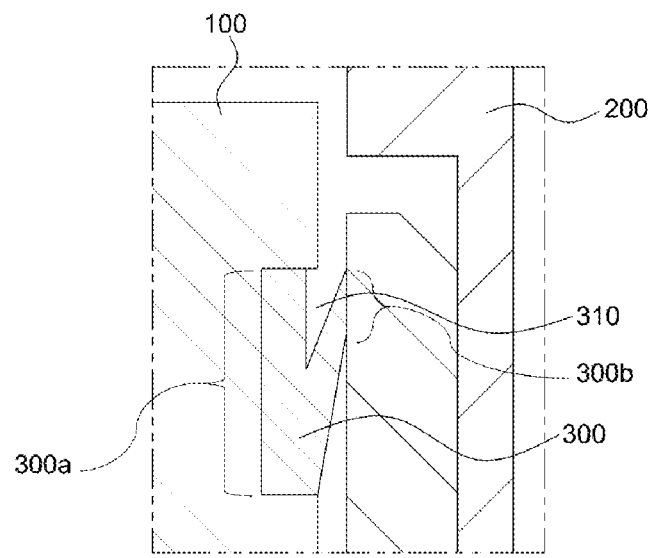
FIG. 4 is an enlarged view of area "A" of FIG. 3 illustrating the configuration of a plunger, a contact member, and a housing according to the exemplary embodiment of the present invention.

FIG. 4 is an enlarged view of area "A" of FIG. 3. According to an exemplary embodiment, the contact member 300 may have the shape of a wedge having a groove 310 therein. Moreover, referring to FIG. 4, the contact member 300 may be formed as a wedge in which the groove 310 is formed in the direction in which the fuel, which has been supplied from the fuel tank and has passed through the hollow portion 110, is introduced into a gap between the housing 200 and the plunger 100.

Thus, when high-pressure fuel is supplied from the fuel tank, the pressure of the supplied fuel may be applied to the cavity 210 through the hollow portion 110, and the pressure of the fuel applied into the cavity 210 may also be applied to the contact member 300. Accordingly, the high-pressure of the fuel may be applied to the groove 310 in the contact member 300, causing the groove 310 in the contact member 300 to be widened. Thus, the contact member 300 may expand between the plunger 100 and the housing 200. As a result, the frictional force between the housing 200 and the plunger 100 may be increased by the expanded contact member 300, which may substantially limit the movement of the plunger 100.

In addition, the airtightness (e.g., airtight seal) between the housing 200 and the plunger 100 may be maintained by the expanded contact member 300. In other words, the expanded contact member 300 may prevent the fuel from leaking from the cavity 210 to the gap between the housing 200 and the plunger 100, thereby maintaining the airtightness of the cavity 210. In addition, when the contact member 300 expands to maintain airtightness between the housing 200 and the plunger 100, more specifically, between the yoke 220 inside the housing 200 and the plunger 100, the contact member 300 may be configured to press the yoke 220, thereby dampening the movement of the plunger 100 by the frictional force generated between the plunger 100 and the yoke 220 and preventing unnecessary vibration from occurring in the plunger 100. In other words, the contact member 300 may operate as a damping element that controls the movement of the plunger 100 in the expanded state thereof.

Conversely, when the amount of fuel supplied from the fuel tank is reduced, the pressure inside the hollow portion 110 and the cavity 210 may be reduced, and thus the expanded contact member 300 may contract to an original state thereof. Thereafter, the frictional force between the housing 200 and the plunger 100 may be reduced by the contact member 300 having the contracted groove 310, which may permit vertical movement of the plunger 100. In particular, the fuel may flow from the cavity 210 to pass through a flow path between the housing 200 and the plunger 100.

In other words, in the present invention, the fuel supply valve may be opened as the plunger moves upward, and when the valve is opened, the difference between the pressures above and below the contact member may be removed, causing the groove 310 to contract, which may reduce the frictional force between the plunger 100 and the housing 200. Thus, in the opened state of the valve, the plunger 100 may be configured to move vertically the housing 200 more smoothly.

According to an exemplary embodiment, the contact member 300 may be formed with a first end thereof is longer than a second end thereof, the longer end may come into contact with the plunger 100, and the shorter end may come into contact with the housing 200. According to an exemplary embodiment, a predetermined area of the longer end of the contact member 300 may be introduced into the plunger 100.

In addition, referring to FIG. 3, in an exemplary embodiment of the present invention, a guide member 400 may be provided to surround the outer circumferential surface of the plunger 100. Specifically, the guide member 400 may be formed around the outer circumferential surface of the plunger 100 at a position below the contact member 300. When the plunger 100 moves vertically, the guide member 400 may be configured to prevent the plunger 100 from excessively tilting to the horizontal direction. In other words, the guide member 400 may assist the contact member 300 in evenly expanding or contracting in the radial direction.

Figure 5:
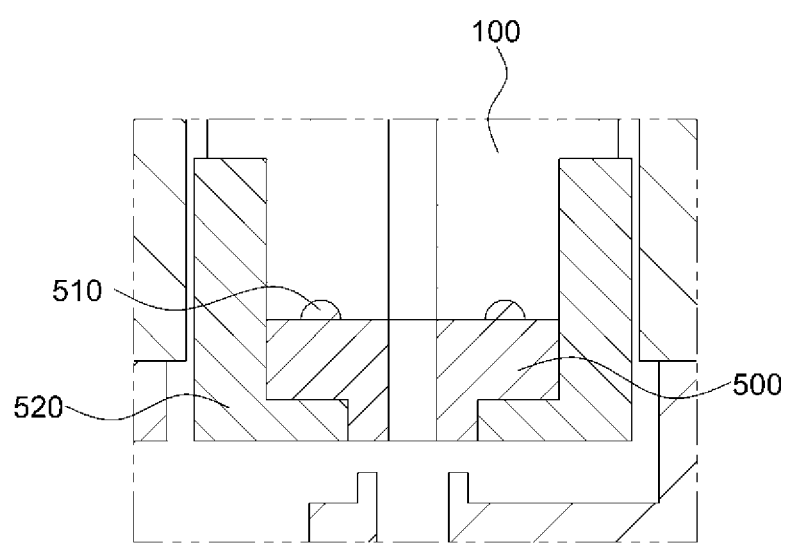
FIG. 5 is an enlarged view of area "B" of FIG. 3 illustrating an area in which fuel is introduced into the valve according to the exemplary embodiment of the present invention.
Figure 6:
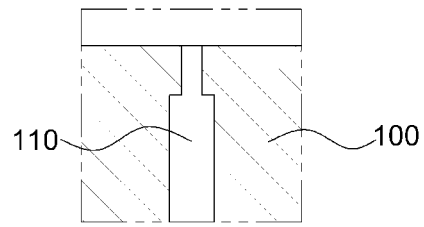
FIG. 6 is an enlarged view of area "C" of FIG. 3 illustrating an end in which the front end of the path configured as an orifice according to the exemplary embodiment of the present invention.

FIG. 5 is an enlarged view of area "B" of FIG. 3. Referring to FIGS. 3 and 5, in an exemplary embodiment of the present invention, the plunger 100 may include the seal 500 fastened to the lower portion of the plunger 100. The seal 500 may be formed of rubber having high hardness, or may be formed of a plastic material having high ductility, such as thermoplastic polyurethane (TPU) or thermoplastic elastomer. Alternatively, the seal 500 may be formed of any other material capable of stably maintaining the shape of the hollow portion 110 (flow path), along which the fuel may flow, while abutting the plunger 100 and maintaining airtightness with respect to the plunger 100. In other words, the seal 500 may be fastened to the plunger 100 at a position between the flow path that extends from the fuel tank and the plunger 100, and may come into close contact with the valve seat therebelow to open or close the flow path between the fuel tank and the fuel cell stack.

In addition, referring to FIG. 5, a protrusion 510 may be formed on the interface between the plunger 100 and the seal 500. The protrusion 510 may have a circular, triangular, or any other polygonal cross section. When the plunger 100 and the seal 500 are engaged with each other, it may be possible to prevent the fuel from leaking from the hollow portion 110 through the interface between the plunger 100 and the seal 500. In addition, in an exemplary embodiment of the present invention, a seal-fixing member 520 may be provided to surround the periphery of the area in which the plunger 100 and the seal 500 are in contact with each other. The seal-fixing member 520 may structurally protect the plunger 100 by surrounding the side surface of the plunger 100, the exterior of the seal 500, and the lower end of the plunger 100. However, in this case, the seal-fixing member 520 does not need to close the location at which the hollow portion 110 and the flow path extending from the fuel tank are connected to each other, and thus may have an "L"-shaped form that is symmetrical about the hollow portion 110. The seal-fixing member 520 may also be configured to primarily absorb shocks transmitted to the valve when the valve is separated from or is brought into contact with the valve seat via vertical movement thereof.

Figure 7:
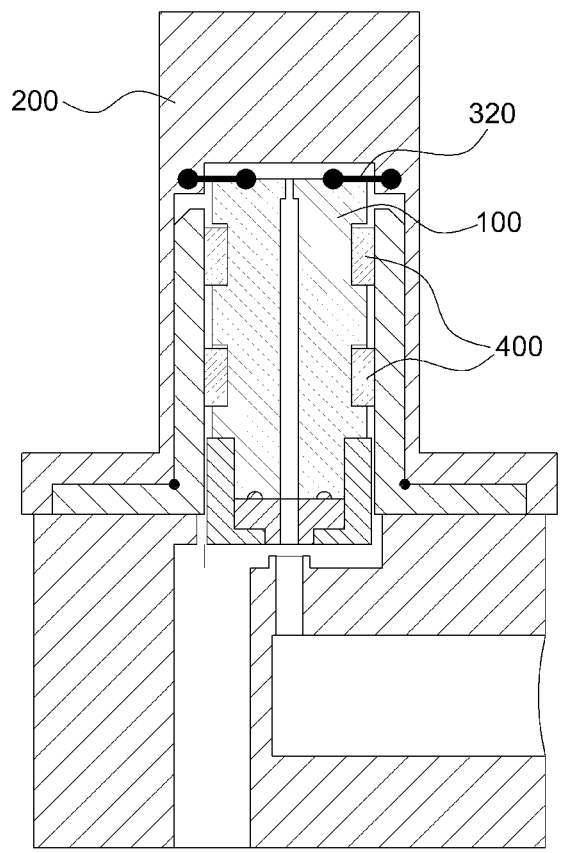
FIG. 7 is a view illustrating the contact member in the form of a diaphragm on the upper end of the plunger according to another exemplary embodiment of the present invention.
Figure 8:
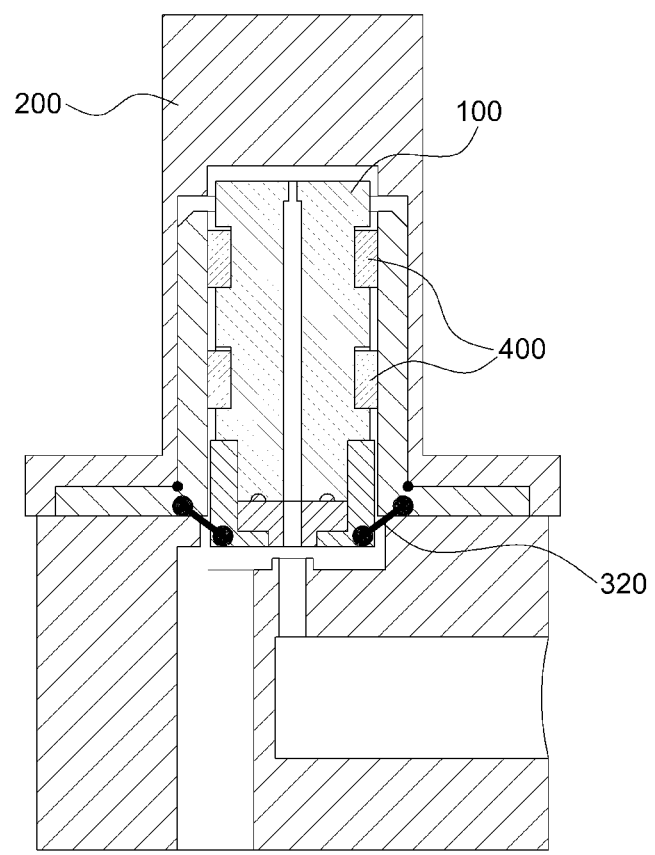
FIG. 8 is a view illustrating the contact member in the form of a diaphragm on the lower end of the plunger according to a further exemplary embodiment of the present invention.

FIGS. 7 and 8 are views illustrating other exemplary embodiments of the present invention. Specifically, in FIGS. 7 and 8, a diaphragm 320 may be used as a contact member. FIG. 7 is a view illustrating a first end of the diaphragm 320 fastened to the upper end of the plunger 100 and a second end of the diaphragm 320 fastened inside the housing 200. In addition, FIG. 8 is a view illustrating a first end of the diaphragm 320 fastened to the lower end of the plunger 100 and a second end of the diaphragm 320 fastened to the housing 200, more particularly, to the lower end of the yoke 200.

Regardless of the position of the diaphragm 320, the diaphragm 320 may operate as the contact member 300, to prevent the leakage of fuel between the plunger 100 and the housing 200 and also prevent sudden movement of the plunger 100. The diaphragm 320 may prevent excessive frictional force due to the contact member 300. Since the diagram 320 is deformed alone, reactivity and movement performance of the plunger 100 may be increased. When the diaphragm 320 is located on the upper end of the plunger 100, a first end of the diaphragm 320 may be fastened to the upper end of the plunger 100, which may efficiently prevent the plunger 100 from moving in the horizontal direction. In addition, when the diaphragm 320 is located beneath the lower end of the plunger 100, the housing 200 may be formed to have a small thickness (e.g., a minimal thickness), which may increase the efficiency of magnetic force with respect to the plunger spring.

In addition, referring again to FIG. 3, an element may be provided to maintain airtightness between the housing 200 and the yoke 220 inside the housing 200. An O-ring 600 may be disposed between the housing 200 and the yoke 220 inside the housing 200. More particularly, the O-ring 600 may be disposed between the housing 200 and the yoke 220 at a position at which the yoke 220 bends inside the housing 200. To prevent damage to the valve housing 200, the O-ring 600 may not be disposed on an upper portion of the housing 200, which has a diameter that is less than the remaining portion of the housing 200, but may be provided on the lower end of the housing 200 to maintain airtightness between the housing 200 and the yoke 220. In addition, the O-ring 600 may fix the housing 200, the yoke 220, and the plunger 100 on the lower end of the housing 200, thereby preventing the plunger 100 from moving in an unintended direction.

As is apparent from the above description, the exemplary embodiments of the present invention have the following effects.

First, compared to a conventional system using two valves, only one valve is used, which enables a reduction in cost and a simplified package, causing the entire system to have a reduced volume.

Second, the fuel tightness of a fuel supply valve may be ensured despite the high pressure applied to the leading end of the valve. In other words, since high-pressure fuel delivered to the leading end of the valve passes through a hollow portion of a plunger and pushes the plunger downwards inside a cavity, the fuel tightness of the valve may be maintained.

Third, in a conventional configuration in which the valve is maintained airtight only by spring force, a spring needs to be designed to maintain airtightness even at a significantly higher pressure than an actual use pressure. Therefore, substantial spring force is required, which frequently causes permanent deformation of a rubber material applied to a seal. However, according to the present invention, since the airtightness of the plunger may be maintained by the pressure of fuel applied to the leading end of the valve, such permanent deformation may be remarkably reduced. In addition, since the spring needs to exert only force required to lift the plunger, the required magnetic force of the spring may be reduced, which may minimize the amount of power required for plunger movement. Thus, the size of the valve may be reduced.

Fourth, by a damping element between the plunger and the housing, abnormal movement (resonance and noise generation) of the plunger, which may be caused by agitation of a fluid, may be prevented.

Finally, both the more accurate control of the flow rate of fuel and the stability of fuel at a high pressure may be achieved using only one valve. Moreover, an overshoot phenomenon, which may occur when high-pressure fuel is instantaneously introduced, may be prevented by the hollow portion of the plunger. In addition, since the orifice of the valve may be designed to have a variable diameter, improved system versatility may be achieved.

In the above description, although specific terms have been used in the drawings and the specification, these terms are merely used in order to describe the present invention and are not used to limit the scope of the present invention defined in the claims. That is, the technical core of the present invention is characterized in that a high-pressure flow path extending from a fuel tank applies high pressure to a cavity through a hollow portion of a plunger and the high pressure in the cavity is maintained airtight by a contact member. However, it will be appreciated by those skilled in the art that the present invention may be implemented to have various modifications and alterations therefrom. Thus, the true technical scope of the present invention should be determined by the technical ideas of the accompanying claims.

In addition, in the description of the embodiments of the present invention, a detailed description of known functions and configurations incorporated herein is omitted when it may make the subject matter of the present invention rather unclear. In addition, the terms used in the above description are defined in consideration of the functions in the embodiments of the present invention, and may be replaced by other terms based on intensions of users or operators, customs, or the like. Hence, the meanings of these terms should be based on the whole content of this specification. Accordingly, the above detailed description of the present invention is not intended to limit the present invention by the disclosed exemplary embodiments, and the accompanying claims should be construed as including other embodiments.

What is claimed is:

1. A fuel supply valve configured to supply fuel from a fuel tank to a stack, comprising:
   a plunger having a hollow portion;
   a housing in which the plunger is configured to move;
   a contact member disposed between the housing and the plunger to be in contact both with one side of the housing and with one side of the plunger; and
   a cavity formed between the housing, the plunger, and the contact member,
   wherein the contact member maintains airtightness of the cavity,
   wherein the fuel is configured to pass through the hollow portion and push the plunger in a direction in which the fuel supply valve is closed,
   wherein a pressure of the fuel is applied to the cavity through the hollow portion, and the pressure of the fuel is applied to the contact member,
   wherein a seal is fastened to the plunger at a position between a flow path that extends from the fuel tank to the stack, and is configured to open or close the flow path between the fuel tank and the stack, and
   wherein the contact member has a groove formed in a direction in which the fuel, having passed through the hollow portion, is introduced to a gap between the housing and the plunger, and wherein the groove is widened by the pressure of the fuel applied to the hollow portion, causing the contact member to expand to maintain airtightness between the housing and the plunger;
   wherein the plunger further includes a guide member formed on an outer circumferential surface thereof at a position below the contact member along the outer circumference.

2. The fuel supply valve of claim 1, wherein the contact member has a first end inserted into dented side of the plunger to move along with the plunger and a second end in close contact with the housing to control movement of the plunger by the contact member inserted into the cavity.

3. The fuel supply valve of claim 2, wherein the first end of the contact member has a length longer than a length of the second end of the contact member.

4. The fuel supply valve of claim 1, further comprising:
   a protrusion formed on a position of an area in which the plunger and the seal are fastened to each other,
   wherein the protrusion prevents the fuel from leaking from the hollow portion through a gap between the plunger and the seal.

5. The fuel supply valve of claim 1, wherein the plunger is symmetrical about the hollow portion.

6. The fuel supply valve of claim 1, further comprising:
an orifice formed between the hollow portion and the cavity,
wherein the hollow portion and the cavity communicate with each other via the orifice.

7. The fuel supply valve of claim 6, wherein the hollow portion has a width greater than a width of the orifice.

8. The fuel supply valve of claim 1, wherein when the fuel supply valve is opened via upward movement of the plunger, the widened groove returns to an original state, and friction between the contact member coupled to the plunger and the housing is reduced.

* * * * *